PSEUDO-INTERLOCK EMPLOYING STROBE SIGNAL WITH SELECTED KEYS
Filed Sept. 20, 1965
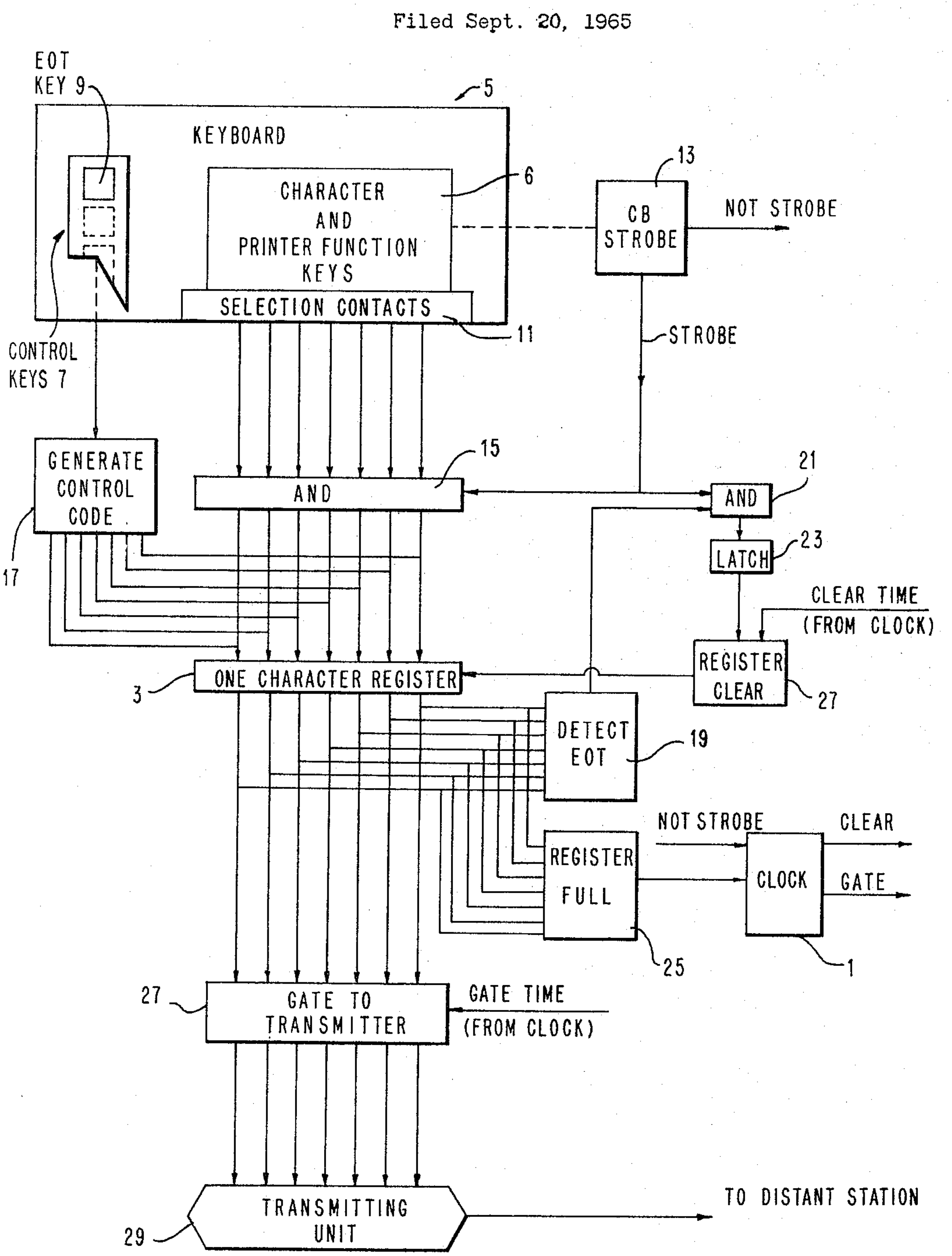
INVENTOR
RANDELL L. JAMES
BY John A. Brady
ATTORNEY United States Patent Office 3,308,918
Patented Mar. 14, 1967

3,308,918

PSEUDO-INTERLOCK EMPLOYING STROBE SIGNAL WITH SELECTED KEYS

Randell L. James, Lexington, Ky., assignor to International Business Machines Corporation, Armonk, N.Y., a corporation of New York Filed Sept. 20, 1965, Ser. No. 488,494
5 Claims. (Cl. 197—107)

This invention relates to the keyboard generation of data. More particularly, this invention relates to means in which the adverse effects of overlapping key depression are avoided.

In the keyboard generation of signals it is known that key depressions by the keyboard operator can follow each other with almost negligible separation in time unless some provision is made to avoid this. The basic structures involved, of course, require some separation in time in order to respond separately to each key depressed. Should the minimum separation in time not occur in a given instance, a malfunction follows in which the keyed data is mutilated, destroyed, or otherwise lost.

It is, therefore, common to provide a mechanical or physical interlock as a part of the keyboard structures. The mechanical interlock may take many forms, but one successful mechanical interlock operates on the concept of wedge or ball displacement. Wedges or balls are situated under the keylevers and just enough room is left in the total area between all of them to accommodate the lever of only one key. The wedges or balls are mounted to be free for small lateral movement. Thus, when one key is depressed a slight readjustment in position takes place and the entire space under all the other keys is occupied by an unyieldable continous series of the wedges or balls. Any attempt to depress another key during this time is simply stopped by the blocking position of the wedges or balls.

Such a mechanical interlock is entirely satisfactory in every respect, and such an interlock could be built to include in its interlocking action every key on the keyboard. However, it is not generally desirable to construct the function keys, such as "carriage return" and "tabulation," to be interlocked with the character keys (alphabet, punctuation, special symbol, and numeral keys).

A major reason why no interlock need be provided between function and character keys is that the physical responses at the printer from the two types of keys have a minimum of interaction. Two character keys each may bring a typing element to the same print station or, as in the typewriter of the preferred embodiment of this invention, the two character keys may operate on a selected, different combination of the same group of mechanical latches to control the rotation and tilt of single element printer. Clearly, a close overlap in the time of the action of two character keys will result in a mechanical jumble of some kind. On the other hand, the functions act independently of printing, and tend to have an inertial delay that is significant. Thus, the start of a carriage return, tabulation, or shift in no way includes structural changes which would influence the movement to the print station of a character selected by a character key at almost the same time as the selection of the function. Also, the movement involved in the function is a relatively massive one which will rarely actually occur soon enough to influence printing of a character selected at almost the same time.

Thus, the need to interlock the character keys to the function keys is minimal. Such interlock is usually avoided, therefore, since the interlock is somewhat of an obstruction to fast keyboard operation and, therefore, reduces somewhat the efficiency of the typist or other keyboard operator. Even when the full physical interlock is desired for certain purposes, it may not be economical to redesign and retool for production of a limited number of machines which are fully interlocked.

It is, therefore, not desirable to physically interlock the character and function keys since the interlock interferes with keyboard operation unduly. On the other hand, in some systems an overlap of character and function timing in response to key operation can be extremely injurious to the quality of the operation. These conflicting factors arise particularly in a teletypewriter operation in which the typewriter will frequently be used locally as an ordinary typewriter. In a teletypewriter operation the signals originated at the keyboard are sensed and transmitted to a distant receiver. In addition to intelligence, the receiving terminals are structured to respond to some transmitted signals to change mode or status. In particular, a preselected signal may turn all receivers to a non-responding, stand-by mode or may cause preselected receivers to become a transmitter for a temporary period so as to transmit some code having to do with control or status of the communications net.

Thus, certain transmitted codes can have significantly detrimental results if transmitted erroneously. On the other hand, it is often desired not to physically interlock every key on the keyboard, especially when the printer might frequently be used for ordinary typing. It is, therefore, a primary object of this invention to provide means to prevent a signal from being transmitted which is generated from the mingling of two keyboard keys in which interlocking has not been accomplished.

It is a more general object of this invention to provide a non-physical interlock which is effective to prevent improper transmissions from a keyboard in which physical interlocking is not fully accomplished.

It is a still more general object of this invention to provide an electrical interlock.

It is a more specific object of this invention to provide a keyboard and transmitting arrangement which allows the keyboard to be not fully interlocked and also prevents the transmission of improper codes.

It is a still more specific object of this invention to provide a keyboard and transmitting arrangement in which the printer function keys are not physically interlocked to the character keys, and in which the transmitting arrangement automatically prevents the transmission of certain preselected signals incorrectly generated.

In accordance with this invention means are provided to generate a characteristic response when any one of a preselected number of keys on the keyboard are activated. At least one key, which generates a certain preselected signal, is excluded from generating the characteristic response. Signals generated are stored in a register before transmission. The register is examined by logical circuits to observe for a code which should have been generated only by the excluded key. If the characteristic response and a code for the excluded key are observed to concur, means are provided to prevent the improper code from being transmitted. In the preferred embodiment the register is simply cleared when it is found to hold an improper code.

The foregoing and other objects, features and advantages of the invention will be apparent from the following more particular description of preferred embodiments of the invention, as illustrated in the accompanying drawing.

The drawing illustrates a transmitter in accordance with the preferred embodiment of this invention.

*System in which used*

This invention was devised in its more specific aspects for use as part of the communicating system of the teletypewriter class described in U.S. patent application Ser.

No. 451,189, filed Apr. 27, 1965, entitled, "Master-Slave Net Control," invented by Wilmer Paul Harbour, Jr., Robert A. Kolpek and Thomas L. Musto, assigned to the same assignee as this invention is assigned. In such a system the receiving terminal may be another terminal operated by an individual, but the receiving terminal may also be a central data processing unit.

With reference to this invention, the most significant aspect of the communications system described in that patent application is the severely disruptive consequences of the End of Text (EOT) code improperly transmitted.

The EOT code is a single data word which is originated in one word time by a keyboard key allocated for that purpose, and which is transmitted as one data word in the same manner as the other character or function codes are transmitted as one data word.

Receipt of an End of Text code at any terminal reverses all previous addressing at the terminal. Thus, an EOT code improperly sent will bring every station on the net to the standby (Control Receive) status or mode. The only thing which can be done to reverse the error is to address the proper stations all over again in the detailed manner described in the referenced U.S. patent application Ser. No. 451,189. The message which was interrupted by the false EOT code can then be completed, but only after all the addressing is duplicated.

A false Error Interrogation (EOB) code can also disrupt the communications net considerably since that signal causes a distant receiving station to automatically come on the net as a transmitter and to then transmit a yes-error or a no-error signal. Although the probable garble from this error can be recognized by the system (the transmitter then repeating the unintelligible portion), the garble created also could appear as an End of Text code, thus completely shutting down the net as above described. Thus, even though electrical interlock against an improper EOT code is often the only one provided, it is contemplated in the alternative in accordance with the preferred aspects of this invention to provide a virtually identical interlock against an improper EOB code.

*Keyboard printer*

This system is built to use the "Selectric" I/O Keyboard Printer as a typewriter terminal. It is when that keyboard printer is used that the preferred embodiment of this invention is operative. The basic keyboard printer is in public use and has been described in various readily available publications. For purposes of this description, applicant will cite U.S. Patent 3,082,854 since as a patent it is easily obtained, and since the description there, even though incident to describing a completely different invention, is believed to be fully sufficient.

In the keyboard printer used the character keys are physically interlocked with one another, but the function keys are not physically interlocked in any manner. In accordance with this invention, that physical structure of the keyboard printer is retained, and an electrical interlock is provided against an erroneous End of Text code being transmitted.

Upon depression of a character key or a function key for a usual function of typing (the functions are carrier return, shift, etc.) mechanical linkages cause a shaft to be engaged. The shaft then drives the printer through a single cycle. More specifically, one of the initial physical movements from the keys mentioned frees a spring clutch which overlaps a continuously rotating drive shaft and a normally non-rotating cycle shaft. The cycle shaft then begins a single revolution, which will be automatically terminated by the disengagement of the spring clutch after the single revolution.

A cycle shaft carries a number of eccentric cams, all of which cams interact with cam followers in a manner required by the purpose of each cam. Thus, six cams interact with six bails to produce a combination of rotation and tilting in the mechanism to thereby select for printing a proper character on the single element, spherical type head. Additionally, one other cam is allocated to each function, such as carriage return and tabulation. Depression of the function key controlling this function frees a cam and follower so that the motions to accomplish the function can be applied from the proper cam to its freed cam follower and then to the printer.

Of particular importance with regard to this invention are the timing cams and the timing cam followers. This can be at least one cam which is followed in every cycle by a cam follower associated with it. This cam follower is used to close a switch, the closed switch being used solely to describe or "clock" each cycle of operation. Use of clock cams in this way in this technology is well known. The assemblies are called circuit breakers or CB's. The signals generated by a CB will herein be denominated as strobe pulses. For the purposes of this invention it can be assumed that one CB exists at the printer which closes at about 85° of each printer cycle and opens at about 130°. Actually, four CB cams and associated CB cam followers exist in the single printer used as a preferred device with this invention. The four CB's exist because the characters and the functions bring into movement different mechanisms. The signals from these cam followers are all connected together in electrical parallel for use in accordance with this invention, and, therefore, a single strobe pulse during each printer cycle is created as though a single CB were used.

In addition to the keys and functions normally found in an I/O typewriter as above described, the terminal as herein used has two additional keys which are related solely to communications net control and coordination. One of these keys generates the End of Transmission (EOT) code character, while the other key generates the Error Interrogation (EOB) code character. Depression of these net control keys in no way alters or initiates a cycle at the I/O typewriter; in particular, a CB is not closed by the depression of the net control keys.

Although other techniques are clearly alternative, the EOT code and the EOB code (which are identical in form to the other codes; specifically, each is a group of bit, no-bit indications, seven in number) are generated by conventional circuitry elements arranged to produce AND, OR and similar well-known logic. Depression of one of the net control keys, the EOT key, for example, mechanically closes one switch. That one switch is an input to the logical circuitry mentioned to produce the simultaneous signals representative of the binary code for EOT. The net control keys are not physically or mechanically interlocked with themselves or with any other key in the I/O typewriter.

*Electronics*

Reference is made to the drawing. The electronic of the transmitting terminal is composed essentially of latch circuits and logical connections to the latch circuits to thereby implement the Boolean logical functions of AND, OR and similar logical functions. A clock 1 produces a series of timing pulses displaced in time which are used to step signals out of one character register 3 into the transmitter and also to clear one character register 3 in accordance with this invention. It is standard in this art to compartmentalize the transfer and the operations upon binary data with electrical circuits by use of discrete timing pulses, and clock 1 is so used to space the occurrence of different circuit operations as herein described. On the other hand, signals from the depression of a key on keyboard 5 are connected directly into the logical inputs of one character register 3 and need not be timed by a clock since it is desired that one character register 3 receive such keyed signals as soon as they are reasonably available.

The terminal includes a keyboard 5, and the keyboard contains the usual character and printer function keys 6 of a typewriter. The character keys are mutually interlocked by physical structures, while the function keys are not physically interlocked to any other key. The keyboard also contains special communication line control keys 7, and, in particular, a key 9 to generate an EOT signal. Each control key 7 is not physically interlocked to any other key.

The character and printer function keys 6 are mechanically linked to the printer to provide the usual typewriting display actions such as the print of an alphabetic symbol or the initiation of a function such as carrier return or tabulate. The normal flow of information from depression of one of these keys 6 is first from the key depressed by indirect mechanical linkage to selection contacts 11 (simply, electrical switches) which are physically closed by printer movement as the printer executes the operation initiated by the key. (Thus, a combination of contacts 11 are simultaneously closed to thereby describe in code the particular character or function initiated by the key depressed.) The data then flows to one character register 3 by essentially direct electrical connection between selection contacts 11 and register 3.

It is necessary to assure that information written into register 3 from selection contacts 11 is transferred at a time during which contacts 11 closed by a previous cycle have opened and contacts 11 to be closed by the current cycle have closed. Therefore, the strobe signal from CB strobe 13 is used and is connected to AND circuit 15. The logical AND relationship thereby required by the structures assures that the selection contacts 11 are read only at times in a printer cycle during which only the proper contacts will be depressed because the strobe circuit 13 comes up only at a point well into the printer cycle. The CB strobe 13 is a signal as discussed above in detail under the heading KEYBOARD PRINTER which is mechanically created by the cycling mechanisms of the printer and which is produced for a continuous time during the middle of a character or printer function cycle.

As mentioned, one character register 3 is composed of latches. These latches are basically of the well-known kind in which a bistable electric circuit is connected with a feedback from the output to the input so that the feedback signal maintains the circuit in the switched condition after it has been switched by some other signal.

To transmit signals in accordance with this invention, one character register 3 comprises seven essentially independent latch circuits as described. Selection contacts 11 are also seven in number, and each of the seven is connected as one switching input to one of the seven latches. Each switch of selection contacts 11 is in a logical AND configuration with a signal from CB strobe 13. Thus, AND 15 shown in the drawing is implemented by a number of different input configurations as just described.

Because the keys 6, the character keys and the function keys, are not interlocked, some probability exists that two operations could be executed essentially simultaneously by the printer and that, therefore, the selection contacts 11 closed would be a jumble or "garble" created by the closing of switches for both operations. This, of course, would be an erroneous code, and it could take the form of a line control code such as the End of Text code. Transmission of the erroneous End of Text code will cause loss of proper contact with the distant station.

In accordance with this invention, however, the structures provided assure that a CB strobe 13 signal also will occur at the time that the erroneous code appears in one character register 3. As distinguished from an erroneous EOT code, a proper EOT code is created by a line control key 7, specifically, EOT key 9. A line control key 7 has no strobe signal associated with it. A proper code is generated in generate control code logic 17, which is directly connected to switches closed directly by the depression of a control key 7. Since the switches are closed manually, overlap of switches closed by keyed information is not a problem and no provision similar to AND 15 is made with regard to control keys 7. The circuitry implementation of all of this is simply based upon the provision of a second switching input to selected ones of the latches in one character register 3. These inputs are activated by the closing of a switch associated with the key 7 depressed and the latches selected are thereby switched as above described.

The output of one character register 3 is connected into detect EOT logic 19. This is a logical circuit of basically well-known configuration. The EOT code in this preferred embodiment is represented by a UP condition of the 4 and 7 latches of one character register 3. Thus, logic 19 is designed to produce a signal on the occurrence of NOT 1, NOT 2, NOT 3, 4, NOT 5, NOT 6, 7.

In accordance with this invention, the output from logic 19 is continually connected as one input to an AND circuit 21. CB strobe 13 is the second input to AND 21. In this manner the concurrence of a strobe signal and an EOT signal is recognized by the structures. A latch 23 is picked to preserve this finding.

Latch 23 is provided so that a delay will exist between the machine response to the existence of an incorrect control code and the clearing of one character register 3. Latch 23 is activated by a pulse from AND 21. The delay made possible by latch 23 is desirable because, if register 3 is cleared while selection contacts 11 are down and CB strobe 13 shows a strobe condition, the same erroneous character would be read immediately back into one character register 3. Since all electrical circuits take some finite time to respond to various inputs, the circuits would not operate positively if the structures allowed an incorrect code to be simultaneously cleared as that code was inserted to be once again cleared.

The clearing of register 3, therefore, takes place on a clock pulse and the clock cycle is started only after the CB strobe 13 terminates. Register full logic 25 is permanently connected to the output of all of the seven latches making up one character register 3. A single UP signal from one of the stages of register 3 produces a pulse from logic 25. This pulse will start clock 1, but only when the NOT strobe signal from circuit 13 also exists. As is conventional, clock 1 is composed of latches driven by a single oscillator, and various, differently spaced pulses are defined by the latch conditions to thereby provide signals at different points in time. The first clock signal, therefore, occurs after the termination of strobe from CB strode 13.

One of the first clock signals is connected as an input to register clear circuit 27. If latch 23 was up, both inputs to register clear circuit 27 are satisfied, and register clear circuit will be rendered operative. One character register 3 is then cleared immediately by register clear circuit 27. Structurally, this is simply implemented by deactivating the feedback loops above mentioned which hold the latches comprising one character register 3 switched, an AND condition with a NOT register clear signal being required in the feedback loop.

The clock 1 also controls the timing of the system when no clearing of register 3 occurs and the information in register 3 is, therefore, automatically passed to the transmitting unit 29. A clock pulse, occurring at a time later than that of the clear clock pulse, is effective to gating means 27 to transfer the information in parallel to transmitting unit 29.

The circuit provided is effective to positively prevent the transmission of an erroneous EOT code generated by an improper character or printer cycle at the printer. Different embodiments may take a multitude of forms since a strobe pulse associated with cycling of the local printer is readily available to designers of different systems. Clearing of an intermediate storage such as one character register 3 also is possible in many forms.

While the invention has been particularly shown and described with reference to preferred embodiments thereof, it will be understood by those skilled in the art that various changes in form and details may be made therein without departing from the spirit and scope of the invention.

I claim:

1. A terminal for typing and for transmitting code signals of at least some messages typed comprising:

a first set of keyboard keys connected to generate signals for transmission when each of said keys is operated, means to create a first condition when a key from said first set of keys is operated, at least one other keyboard key connected to generate signals for transmission when operated, a register to store signals generated prior to transmission of said signals, means responsive to signals stored in said register to create a second condition when said register holds a signal identical in meaning to that created by said other key, means to generate a response condition when said first condition and said second condition both occur prior to the keyboard generation of a subsequent signal, and means controlled by said response condition to inhibit transmission of the contents which created said second condition of said register.

2. The terminal as in claim 1 in which said first set of keys each initiate a printer cycle and said first condition is generated by mechanical switch means linked to the cycling mechanisms of said printer.

3. The terminal as in claim 2 wherein said signals generated by said first set of keys are stored in said register under the control of said mechanical switch and when said mechanical switch is moved during the cycling of said printer.

4. The terminal as in claim 1 in which transmission of the contents of said register is inhibited by the clearing of signals stored in said register.

5. The terminal as in claim 4 in which said first set of keys each initiate a printer cycle and said signals generated by said first set of keys are stored in said register under the control of mechanical switch means linked to the cycling mechanisms of said printer and are stored when said mechanical switch is moved during the cycling of said printer and in which said means to inhibit by clearing of signals is made effective from the said mechanical switch when said mechanical switch is moved to terminate said storage of signals into said register.

References Cited by the Examiner

UNITED STATES PATENTS

| | | | |
|---|---|---|---|
| 2,644,038 | 6/1953 | Branson | 178—79 |
| 2,716,230 | 8/1955 | Oliva | 197—107 X |
| 2,737,647 | 3/1956 | Oliva | 178—23 X |
| 3,117,219 | 1/1964 | Merfeld | 178—23 X |

References Cited by the Applicant

UNITED STATES PATENTS

| | | |
|---|---|---|
| 2,234,263 | 6/1939 | Lake et al. |

ROBERT E. PULFREY, *Primary Examiner.*

E. S. BURR, *Assistant Examiner.*